US007295536B2

(12) United States Patent
Refai et al.

(10) Patent No.: US 7,295,536 B2
(45) Date of Patent: Nov. 13, 2007

(54) SYSTEMS AND METHODS FOR SOFT HANDOFF AND OTHER DIVERSITY COMMUNICATION USING BASE STATIONS SUPPORTING COMMON RADIO CONFIGURATIONS

(75) Inventors: Wail Refai, Apex, NC (US); Essam Sourour, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 1346 days.

(21) Appl. No.: 09/754,490

(22) Filed: Jan. 4, 2001

(65) Prior Publication Data

US 2002/0126637 A1 Sep. 12, 2002

(51) Int. Cl.
*H04Q 7/00* (2006.01)
*H04B 7/216* (2006.01)
*H04J 3/16* (2006.01)
*H04J 3/22* (2006.01)
*H04J 13/00* (2006.01)

(52) U.S. Cl. .................. 370/331; 370/335; 370/465; 370/479

(58) Field of Classification Search ................ 455/260, 455/255, 258–259, 265, 112, 113, 76, 126, 455/118, 180.3, 183.1, 182.3, 77, 84, 86, 455/87, 75, 114, 442, 436, 437; 327/105, 327/113; 370/331, 332, 334, 328, 436, 437, 370/335
See application file for complete search history.

(56) References Cited

U.S. PATENT DOCUMENTS 5,649,308 A  7/1997  Andrews ................. 370/334
5,926,470 A * 7/1999  Tiedemann, Jr. ........... 370/334
5,999,815 A * 12/1999 TenBrook et al. ........ 455/553.1
6,021,123 A *  2/2000  Mimura ..................... 370/331

(Continued)

FOREIGN PATENT DOCUMENTS

WO    WO 95/17077    6/1995

(Continued)

OTHER PUBLICATIONS

"Mobile Station-Base Station Compability Standard for Dual-Mode Spread Spectrum Systems," SP-3693-1, Publish Version, Oct. 31, 1998, pp. 6-346-6-411.

(Continued)

*Primary Examiner*—Edan D. Orgad
*Assistant Examiner*—Blanche Wong
(74) *Attorney, Agent, or Firm*—Myers Bigel Sibley & Sajovec PA

(57) ABSTRACT

A wireless terminal and a first node communicate according to a first radio configuration of a first set of radio configurations supported by the first node. A second radio configuration that is available for a second node that supports a second set of radio configurations that is different from the first set of radio configurations is then identified. The wireless terminal and respective ones of the first and second nodes then simultaneously communicate according to the identified second radio configuration. In other embodiments, a wireless terminal is handed off from a first base station to a second base station based on a determination of whether a common radio configuration is available for the first and second base stations. Related wireless communications systems and wireless terminal apparatus are also described.

37 Claims, 6 Drawing Sheets

U.S. PATENT DOCUMENTS

| | | | |
|---|---|---|---|
| 6,253,085 B1 * | 6/2001 | Bender | 455/442 |
| 6,307,849 B1 * | 10/2001 | Tiedemann, Jr. | 370/335 |
| 6,493,554 B1 * | 12/2002 | Kanerva et al. | 455/437 |
| 6,507,567 B1 * | 1/2003 | Willars | 370/321 |
| 6,542,744 B1 * | 4/2003 | Lin | 455/437 |
| 6,567,666 B2 * | 5/2003 | Czaja et al. | 370/331 |
| 6,611,507 B1 * | 8/2003 | Hottinen et al. | 455/436 |
| 6,704,581 B1 * | 3/2004 | Park et al. | 370/331 |
| 6,714,528 B1 * | 3/2004 | Moon et al. | 370/342 |
| 6,741,578 B1 * | 5/2004 | Moon et al. | 370/335 |
| 6,795,411 B1 * | 9/2004 | Dino et al. | 370/329 |
| 7,043,244 B1 * | 5/2006 | Fauconnier | 455/442 |
| 2002/0018529 A1 * | 2/2002 | Dabak et al. | 375/267 |
| 2002/0085514 A1 * | 7/2002 | Illidge et al. | 370/329 |
| 2003/0012217 A1 * | 1/2003 | Andersson et al. | 370/437 |

FOREIGN PATENT DOCUMENTS

| | | |
|---|---|---|
| WO | WO 99/35872 | 7/1999 |
| WO | WO 00/38465 | 6/2000 |
| WO | WO 01/65881 A1 | 9/2001 |

OTHER PUBLICATIONS

"Mobile Station-Base Station Compability Standard for Dual-Mode Spread Spectrum Systems," SP-3693-1, Publish Version, Oct. 31, 1998, pp. 7-2-7-72.

"Mobile Station-Base Station Compability Standard for Dual-Mode Spread Spectrum Systems," SP-3693-1, Publish Version, Oct. 31, 1998, pp. 6-12-6-85.

"Physical Layer Standard for cdma2000 Spread Spectrum Systems," Release A, $3^{rd}$ Generation Partnership Project 2 "3GPP2", Version 55, Dec. 15, 1999, pp. 2-46-2-183.

"Physical Layer Standard for cdma2000 Spread Spectrum Systems," Release A, $3^{rd}$ Generation Partnership Project 2 "3GPP2", Version 55, Dec. 15, 1999, pp. 3-3-3-160.

TIA/EIA/IS-2000.5-A-1, Mar. 2000, pp. 2-346-2-472.

"Handover Requirements Between UMTS and GSM or Other Radio Systems" *European Telecommunication Standard* 3G TS 22.129 3.2.0, pp. 1-20 (1999).

International Search Report for PCT/US 02/01134; Date of Mailing Apr. 12, 2002.

* cited by examiner

SYSTEMS AND METHODS FOR SOFT HANDOFF AND OTHER DIVERSITY COMMUNICATION USING BASE STATIONS SUPPORTING COMMON RADIO CONFIGURATIONS

BACKGROUND OF THE INVENTION

The present invention relates to communications systems and methods, and more particularly, to systems and methods for diversity communication in wireless communications systems.

As known to those skilled in the art, a cellular wireless communications system typically includes a plurality of base stations that support radio communications with wireless terminals, e.g., vehicle-mounted or handheld cellphones or other communications devices, over a plurality of geographical areas referred to as "cells." Typically, when a terminal begins to move to the fringe of a first cell, toward a second cell, it attempts to establish communications with the base station serving the second cell in order to continue the call or other communications session in which it is currently engaged.

Such a procedure, commonly referred to as a "handoff," may be performed in a number of different ways. For example, in many conventional systems, a "hard handoff" procedure is performed wherein a terminal ends communications with a first base station before resuming communications with a second base station. Although such a procedure can be effective, it may be vulnerable to "call drops" or other interruptions during the attempted handoff.

Systems providing code division multiple access (CDMA) using channels defined by spreading codes commonly offer a capability, referred to as "soft handoff," in which a terminal can transition from a first base station to a second base station using an intermediate stage in which the terminal communicates simultaneously with both base stations. Such a capability can arise because CDMA terminals and base station equipment typically use a RAKE receiver architecture that allows signals carrying the same information but transmitted by multiple base stations over different signal paths to be commonly processed to achieve the benefits of spatial diversity. Soft handoff procedures for IS-95 CDMA are described in Section 6.6 of *Mobile Base Station Compatibility Standard for Dual-Mode Spread Spectrum Systems*, TIA/EIA-95-B (October 1998).

This capability of conventional CDMA receivers may also be used for purposes other than soft handoff. For example, simultaneous transmission from multiple base stations may be used to improve signal reception at a terminal, thus allowing the transmit power from each base station to be reduced. This can reduce interference and, thus, can increase available capacity in a wireless communications system.

Newly proposed CDMA standards typically are designed to be backward compatible with older CDMA standards, such that systems implementing a new standard are capable of supporting terminals designed to conform to an older standard. For example, the new IS-2000 specification includes radio configurations, i.e., combinations of spreading and other channel codes, that are also included in the IS-95 specification, as well as newer, e.g., higher data rate, radio configurations that are not supported under the IS-95 specification.

SUMMARY OF THE INVENTION

According to embodiments of the present invention, a wireless terminal and a first node communicate according to a first radio configuration of a first set of radio configurations supported by the first node. A second radio configuration that is available for a second node that supports a second set of radio configurations that is different from the first set of radio configurations is then identified. The wireless terminal and respective ones of the first and second nodes then simultaneously communicate according to the identified second radio configuration. In other embodiments of the present invention, a wireless terminal is handed off from a first base station supporting a first set of radio configurations to a second base station supporting a second set of radio configurations that is different than the first set of radio configurations. The wireless terminal is handed off from the first base station to the second base station based on a determination of whether a common radio configuration is available for the first and second base stations. The present invention may be embodied as methods, wireless communications systems and wireless terminal apparatus.

DETAILED DESCRIPTION

Figure 1:
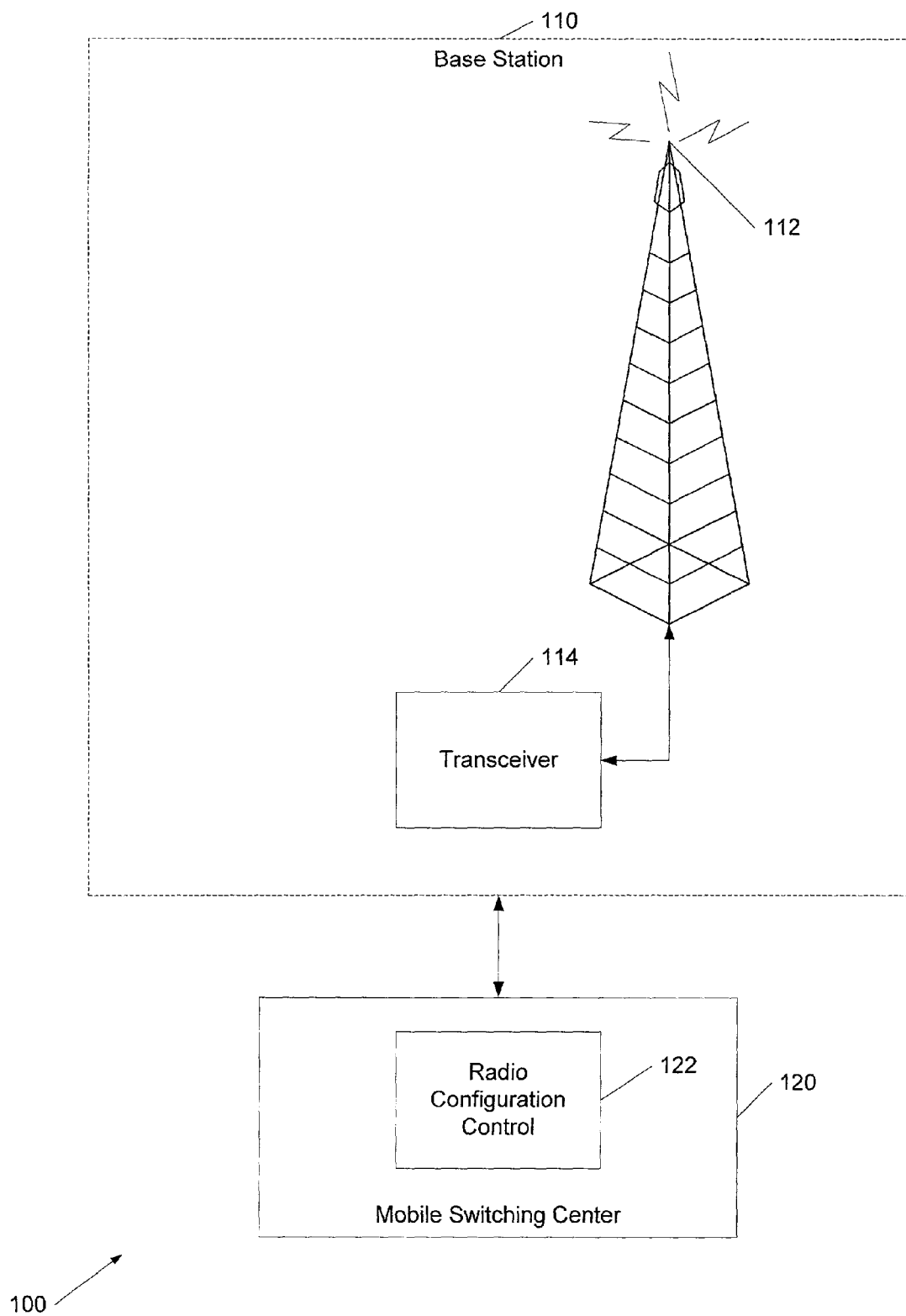
FIG. 1 is a schematic diagram of a wireless communications system according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

According to embodiments of the present invention, a wireless terminal and a first node communicate according to a first radio configuration of a first set of radio configurations supported by the first node. A second radio configuration that is available for a second node that supports a second set of radio configurations that is different from the first set of radio configurations is then identified. The wireless terminal and respective ones of the first and second nodes then simultaneously communicate according to the identified second radio configuration. In some embodiments of the invention, a first one of the first and second sets of radio configurations is constrained to radio configurations that are compliant with a wireless communications standard, and a second one of the first and second sets of radio comprises radio configurations that are compliant with the wireless communications standard and radio configurations that are non-compliant with the wireless communications standard. For example, a first one of the first and second sets of radio configurations may be constrained to IS-95 compliant radio configurations, and a second one of the first and second sets of radio configurations may include IS-2000 compliant radio configurations that are non-compliant with IS-95.

In other embodiments of the present invention, a wireless terminal is handed off from a first base station supporting a first set of radio configurations to a second base station supporting a second set of radio configurations that is different than the first set of radio configurations. In particular, the wireless terminal is handed off from the first base station to the second base station based on a determination of whether a common radio configuration is available for the first and second base stations. In some embodiments of the present invention, handing off the wireless terminal from the first base station to the second base station based on the determination of whether a common radio configuration is supported by the first and second base stations comprises performing a soft handoff of the wireless terminal using the common radio configuration. In other embodiments of the present invention, handing off the wireless terminal from the first base station to the second base station based on the determination of whether a common radio configuration is available for the first and second base stations comprises performing a hard handoff from the first base station to the second base station if a common radio configuration is not available.

In yet other embodiments of the present invention, a wireless communications system includes a first node operative to communicate with a wireless terminal according to any of a first set of radio configurations. The wireless communications system further includes a radio configuration control circuit operative to identify a common radio configuration of the first set of radio configurations that is also a member of a second set of radio configurations supported by a second node and to responsively cause the first and second nodes to simultaneously communicate with the wireless terminal according to the identified common radio configuration.

In still further embodiments of the present invention, a wireless terminal comprises a transceiver circuit operative to communicate according to a set of radio configurations. The wireless terminal further includes a radio configuration control circuit coupled to the transceiver circuit and operative to cause the transceiver circuit to communicate with a first node using first radio configuration of the set of radio configurations, to identify a second radio configuration of the set of radio configurations supported by a second node, and to responsively cause the transceiver circuit to simultaneously communicate with respective ones of the first and second nodes according to the second radio configuration.

In the present application, FIGS. 1-6 are schematic diagrams and flowcharts illustrating exemplary communications apparatus and operations according to embodiments of the present invention. It will be understood that blocks of the schematic diagrams and flowcharts, and combinations of blocks therein, may be implemented using one or more electronic circuits, such as circuits included in a wireless terminal or in a wireless communications system (e.g., in a cellular base station or other device), or circuitry used in other types of wireless, wireline, optical and other communications systems. It will also be appreciated that, in general, blocks of the schematic diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the operations specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the operation specified in the block or blocks. Accordingly, blocks of the schematic diagrams and flowcharts support electronic circuits and other means that perform the specified operations, as well as acts for performing the specified operations.

It will also be appreciated that the apparatus and operations illustrated in FIGS. 1-6 may be implemented in a variety of communications environments. For example, the communications apparatus and operations illustrated in FIGS. 1-6 may be embodied in a wireless terminal, a wireless base station, a wireline communications device, an optical communications device, or other communications apparatus. It will be appreciated that the processing apparatus and operations illustrated in FIGS. 1-6 may be combined with other apparatus and operations (not shown), including additional signal processing apparatus (e.g., circuits that provide such capabilities) and operations.

The discussion herein relates to communications between wireless terminals and nodes of a wireless communications system. As used herein, a node of a wireless communications system may include, but is not limited to, a base station, or a portion thereof, that serves a geographical area commonly referred to as a cell. It will be appreciated that "base stations" include not only base stations configured for omnidirectional communications around the site of a base station centrally located in a cell, but also respective portions of base stations that serve respective "sector" cells, i.e., base stations that serve multiple cells using respective antennas with patterns that emanate at respective angular ranges from the base station site. It will be further appreciated that nodes of a wireless communications system may also comprise apparatus that perform similar functions, such as distributed radio heads that are commonly used in cellular networks located in buildings or other structures. Accordingly, although the following discussion specifically refers to communications between wireless terminals (e.g., cellular telephones) and cellular base stations, it will be understood that the present invention is also applicable to communications for other types of nodes of a wireless communications system.

As known to those skilled in the art, wireless communications standards, such as the IS-95 and IS-2000 CDMA standards, specify different radio configurations (RCs), sets of which may be supported by a given base station. For the aforementioned IS-95 and IS-2000 CDMA standards, the radio configurations comprise respective configurations of spreading codes and error correction codes that may be applied to transmitted information to achieve various sets of data rates. For example, as shown in Table 1, the IS-2000 standard describes a set of nine (9) different possible radio configurations RC1, RC2, . . . , RC9 that may be used for a forward (base station to terminal) link, two of which RC1, RC2 are supported under to the older IS-95 standard.

TABLE 1

| RC | Description |
| --- | --- |
| RC1 | IS-95 rate set 1 compatible |
| RC2 | IS-95 rate set 2 compatible |
| RC3 | 1500, 2700, 4800, 9600, 38400, 76800, and 153600 bits per second (bps) |
| RC4 | 1500, 2700, 4800, 9600, 38400, 76800, 153600, and 307200 bps |
| RC5 | 1800, 3600, 7200, 14400, 28800, 57600, 115200, and 230400 bps |
| RC6 | 1500, 2700, 4800, 9600, 19200, 38400, 76800, 153600, and 307200 bps |
| RC7 | 1500, 2700, 4800, 9600, 19200, 38400, 76800, 153600, 307200, and 614400 bps |
| RC8 | 1800, 3600, 7200, 14400, 28800, 57600, 115200, 230400, and 460800 bps |
| RC9 | 1800, 3600, 7200, 14400, 28800, 57600, 115200, 230400, 460800, and 1036800 bps |

Similarly, as shown in Table 2, the IS-2000 standard describes six (6) different radio configurations RC1, RC2, . . . , RC6 that may be used for a reverse (terminal to base station) link, two of which RC1, RC2 are supported under the IS-95 standard.

TABLE 2

| RC | Description |
| --- | --- |
| RC1 | IS-95 rate set 1 compatible |
| RC2 | IS-95 rate set 2 compatible |
| RC3 | 1500, 2700, 4800, 9600, 19200, 38400, 76800, and 153600 bits per second (bps) |
| RC4 | 1800, 3600, 7200, 14400, 28800, 57600, 115200, and 230400 bps |
| RC5 | 1500, 2700, 4800, 9600, 19200, 38400, 76800, and 153600 bps |
| RC6 | 1800, 3600, 7200, 14400, 28800, 57600, 115200, 230400 and 460800 bps |

FIG. 1 illustrates a wireless communications system 100 according to embodiments of the present invention. The system 100 includes a base station 110, here shown as including an antenna 112 coupled to a radio transceiver 114, such as CDMA transceiver that transmits and receives signals that are encoded according to channel codes that include user-specific spreading codes. The system 100 also includes a radio configuration control circuit 122, here shown as implemented in a mobile switching center 120 coupled to the base station 110. The radio configuration control circuit 122 is operative to control the radio configuration(s) used by the transceiver 114. For example, the radio configuration control circuit 122 may implement operations as described below with reference to FIGS. 3-6.

It will be appreciated that the wireless communications system 100 may be implemented using conventional wireless communications components. For example, the radio configuration control circuit 122 may be implemented using program code executing on a computer or other data processing apparatus positioned at the mobile switching center 120. In such an implementation, the radio configuration control circuit 122 may control the transceiver 120 using, for example, communications functions conventionally used to control operations of a base station transceiver. For example, such communications functions may be implemented in software modules and/or circuits that interact with other software modules and/or circuit that implement functions of the radio configuration control circuit 122. It will be appreciated that, in general, the radio configuration control circuit 122 may be implemented using special purpose hardware, such as an application specific integrated circuit (ASIC), software and/or firmware executing on a general purpose processor, such as a microprocessor, microcontroller or digital signal processor (DSP), or combinations thereof.

It will be appreciated that wireless communications systems according to other embodiments of the present invention need not be limited to the architecture illustrated in FIG. 1. For example, rather than implementing the radio configuration control circuit 122 in an mobile switching circuit 120, such functionality may be located in some other component of a wireless communications system, for example, in a processor or other control circuitry located at the site of a base station. Alternatively, this functionality may be distributed over multiple components of a wireless communications system.

Figure 2:
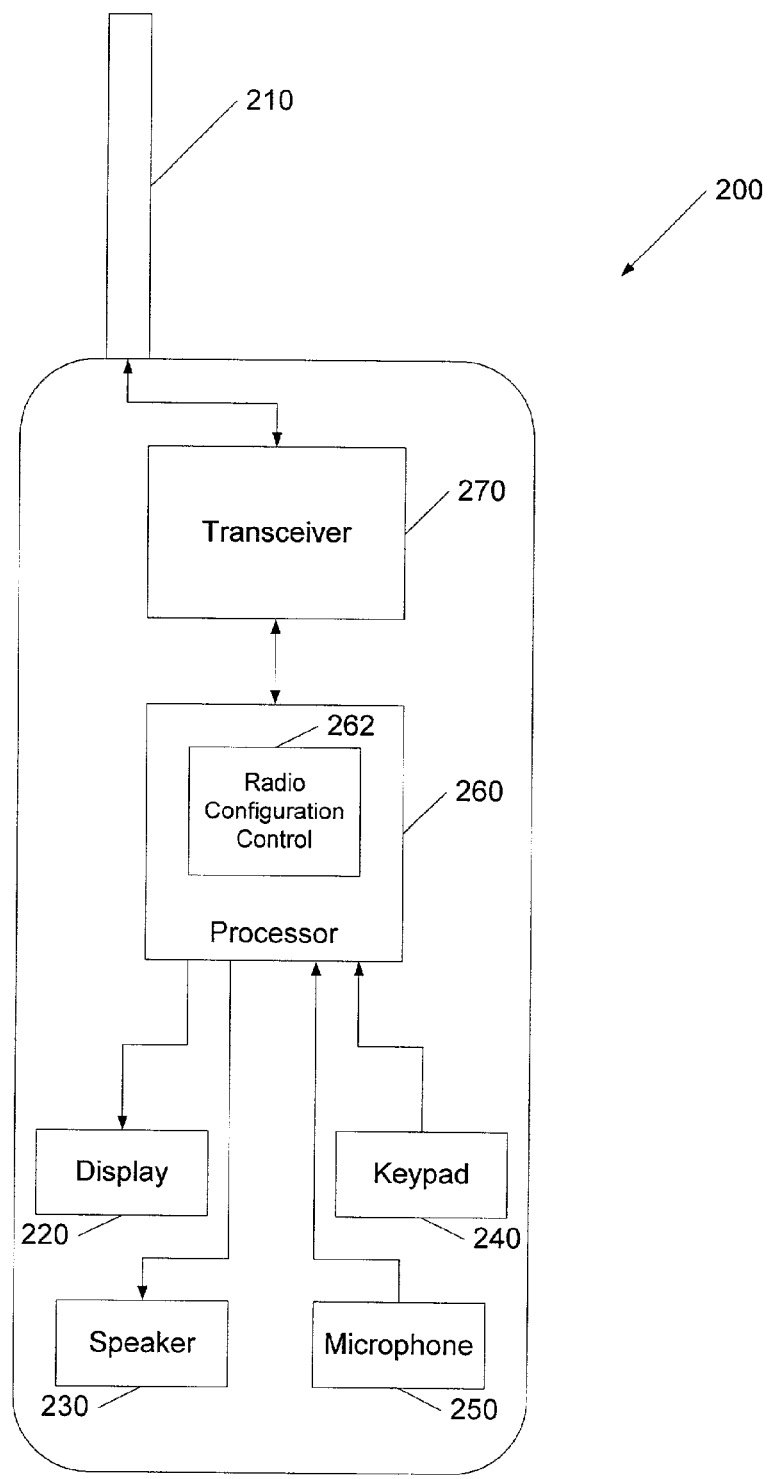
FIG. 2 is a schematic diagram of a wireless terminal according to embodiments of the present invention.

FIG. 2 illustrates a wireless communications terminal 200 according to other embodiments of the present invention. The terminal 200 includes a processor, such as a microprocessor, microcontroller, DSP or ASIC, that is operatively associated with a display 220, a speaker 230, a keypad 240 and a microphone 250, operations of which are known to those skilled in the art and will not be discussed in detail herein. The processor 260 is also coupled to a radio transceiver 270, such as a CDMA transceiver operative to transmit and receive signals that are encoded according to spreading codes. The processor 260 is operative to control transmission and reception of radio signals by the transceiver 270 via an antenna 210.

As shown, a radio configuration control circuit 262 is implemented by the processor 260. For example, the processor 260 may comprise a microprocessor or similar device, and the radio configuration control circuit 262 may comprise software and/or firmware executing on the processor 260 and operative to implement, for example, radio configuration control functions as described below in reference to FIGS. 3-6. In such an implementation, the radio configuration control circuit 262 may control the transceiver 270 using, for example, communications functions conventionally used to control such a wireless terminal transceiver. For example, such communications functions may be implemented in software modules and/or circuits that interact with other software modules and/or circuit that implement functions of the radio configuration control circuit 262. It will be appreciated that, in general, the radio configuration control circuit 262 may be implemented using special purpose hardware, such as an application specific integrated circuit (ASIC), software and/or firmware executing on a general purpose processor, such as a microprocessor, microcontroller or digital signal processor (DSP), or combinations thereof.

Figure 3:
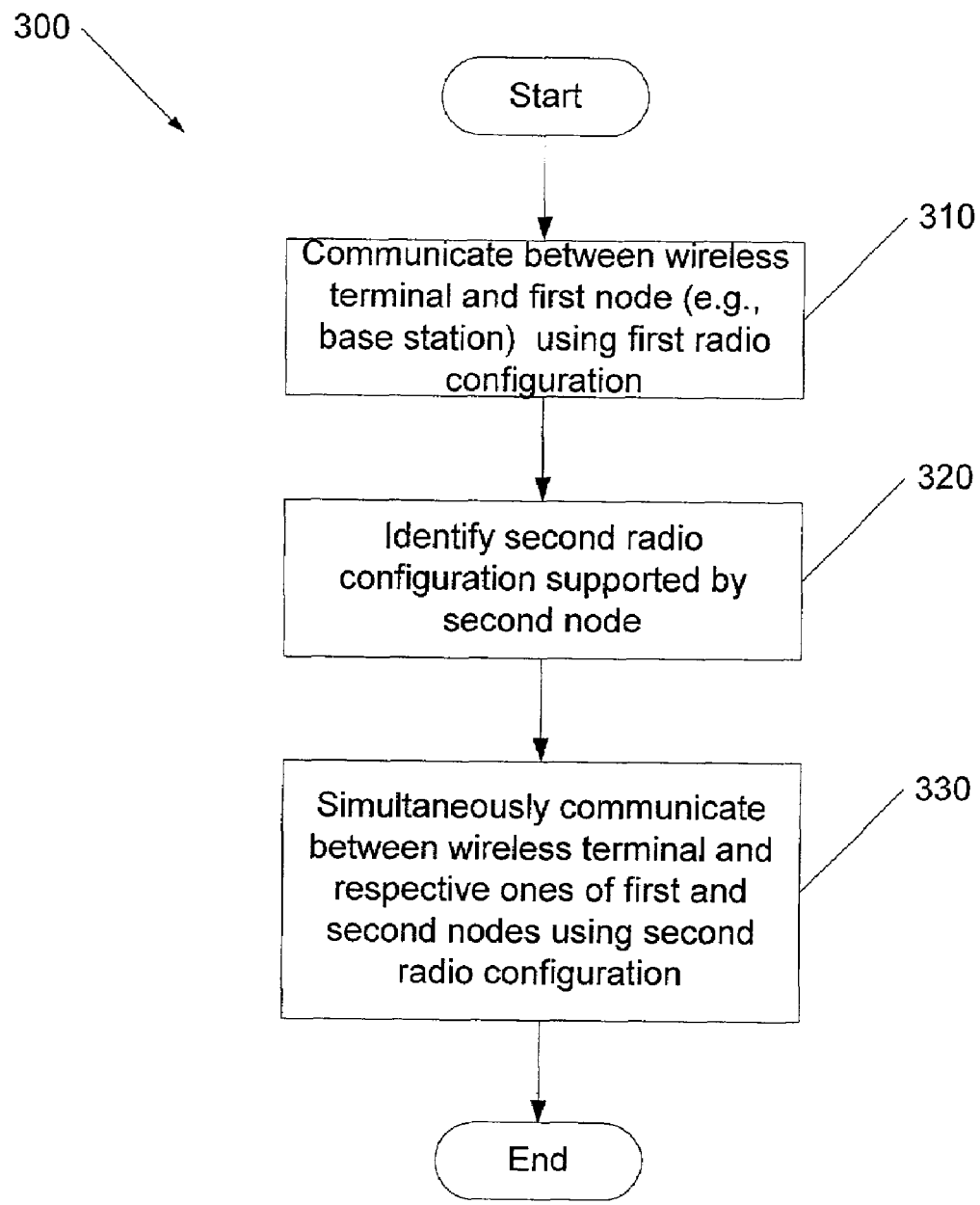
FIGS. 3-6 are flowcharts illustrating exemplary operations according to various embodiments of the present invention.

FIG. 3 illustrates exemplary operations 300 according to embodiments of the present invention. A wireless terminal and a first node (e.g., a first base station) of a wireless communications system communicate according to a first radio configuration (Block 310). A second radio configuration supported by a second node (e.g., a second base station) is identified (Block 320). For example, a radio configuration control circuit located at the first node and/or at the terminal (such as the radio configuration control circuit 122 of FIG. 1 and/or the radio configuration control circuit 262 of FIG. 2) may identify the second node as a candidate node for handoff or for some other diversity transmission/reception mode, and may identify the second radio configuration as a radio configuration that is commonly supported by the terminal and the first and second nodes.

Responsive to identification of the commonly supported radio configuration, the wireless terminal simultaneously communicates with respective ones of the first and second nodes using the identified common radio configuration (Block 330). For example, a first radio configuration control circuit, such as the radio configuration control circuit 122 of FIG. 1, may be operatively associated with the first node. In concert with a second radio configuration control circuit located at the wireless terminal (e.g., the radio control circuit 262 of FIG. 2), the first radio configuration control circuit may cause the first and second nodes to simultaneously transmit the same information encoded according to the same channel coding (including spreading code). A RAKE receiver of the wireless terminal may process a composite signal including the first and second signals transmitted from the respective first and second nodes according to a RAKE process to recover the transmitted information. RAKE receiver operations are known to those skilled in the art, and will not be discussed in greater detail herein.

Figure 4:
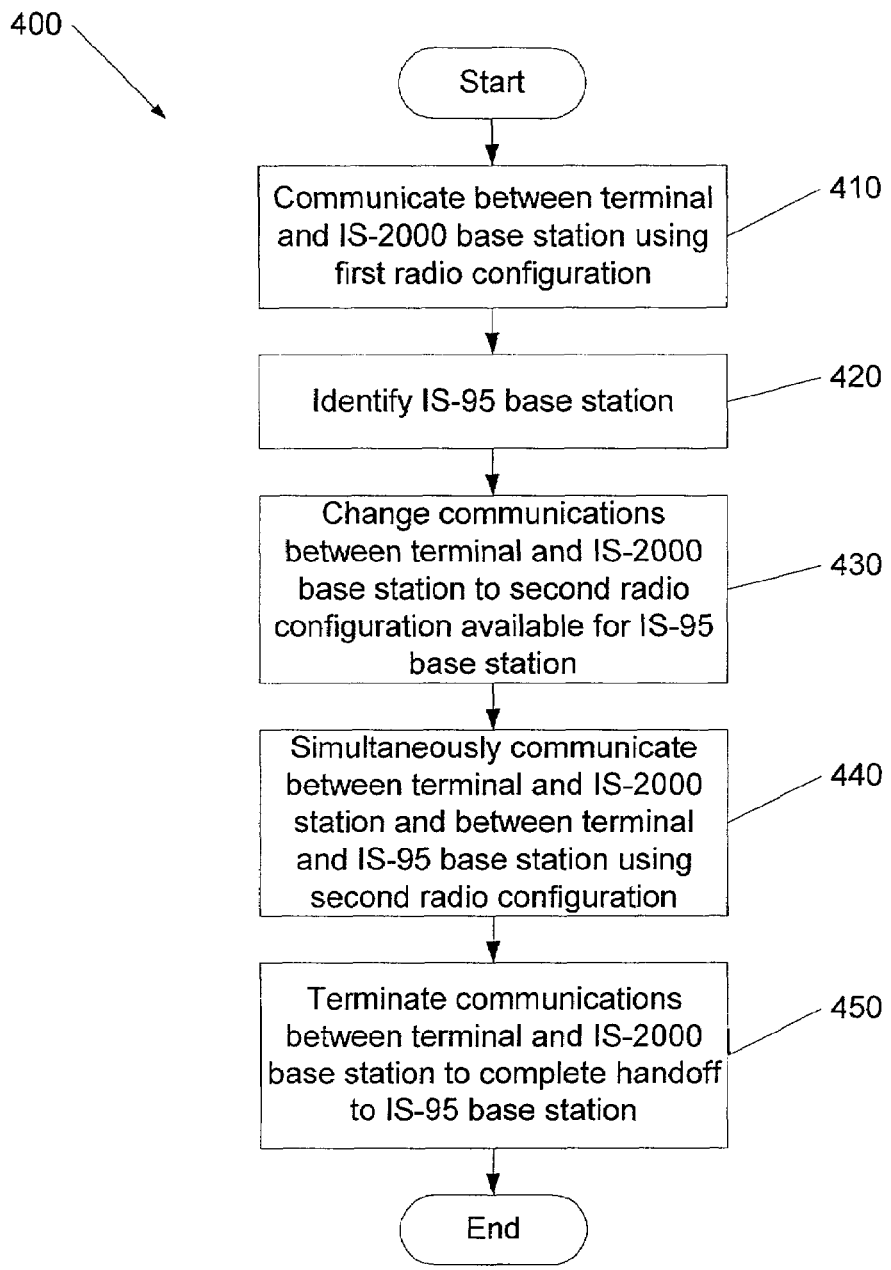

FIG. 4 illustrates exemplary operations 400 according to embodiments of the present invention, in which a soft handoff is performed between an IS-2000 capable base station and an IS-95 capable base station. A wireless terminal communicates with an IS-2000 base station using a first radio configuration (Block 410). An IS-95 station is identified (Block 420). For example, the identified IS-95 base station may comprise a best candidate base station identified according to a criterion such as received signal strength (RSSI) of a pilot code transmitted by the base station, or a candidate base station having a strongest RSSI with a preferred radio configuration available. It will be appreciated that other criteria may be also be used with the present invention.

Communications between the wireless terminal and the IS-2000 base station are changed to conform to a second radio configuration that is supported by the IS-95 base station (Block 430). This action may occur responsive to, for example, a command relayed to the wireless terminal from the base station and/or to a request transmitted by the wireless terminal to the base station. After changing the radio configuration used for communicating with the IS-2000 base station, the wireless terminal then simultaneously communicates with respective ones of the IS-2000 base station and the IS-95 base station using the second radio configuration (Block 440). Communications between the wireless terminal and the IS-2000 base station may be subsequently terminated to complete soft handoff of the wireless terminal to the IS-95 base station (Block 450).

Figure 5:
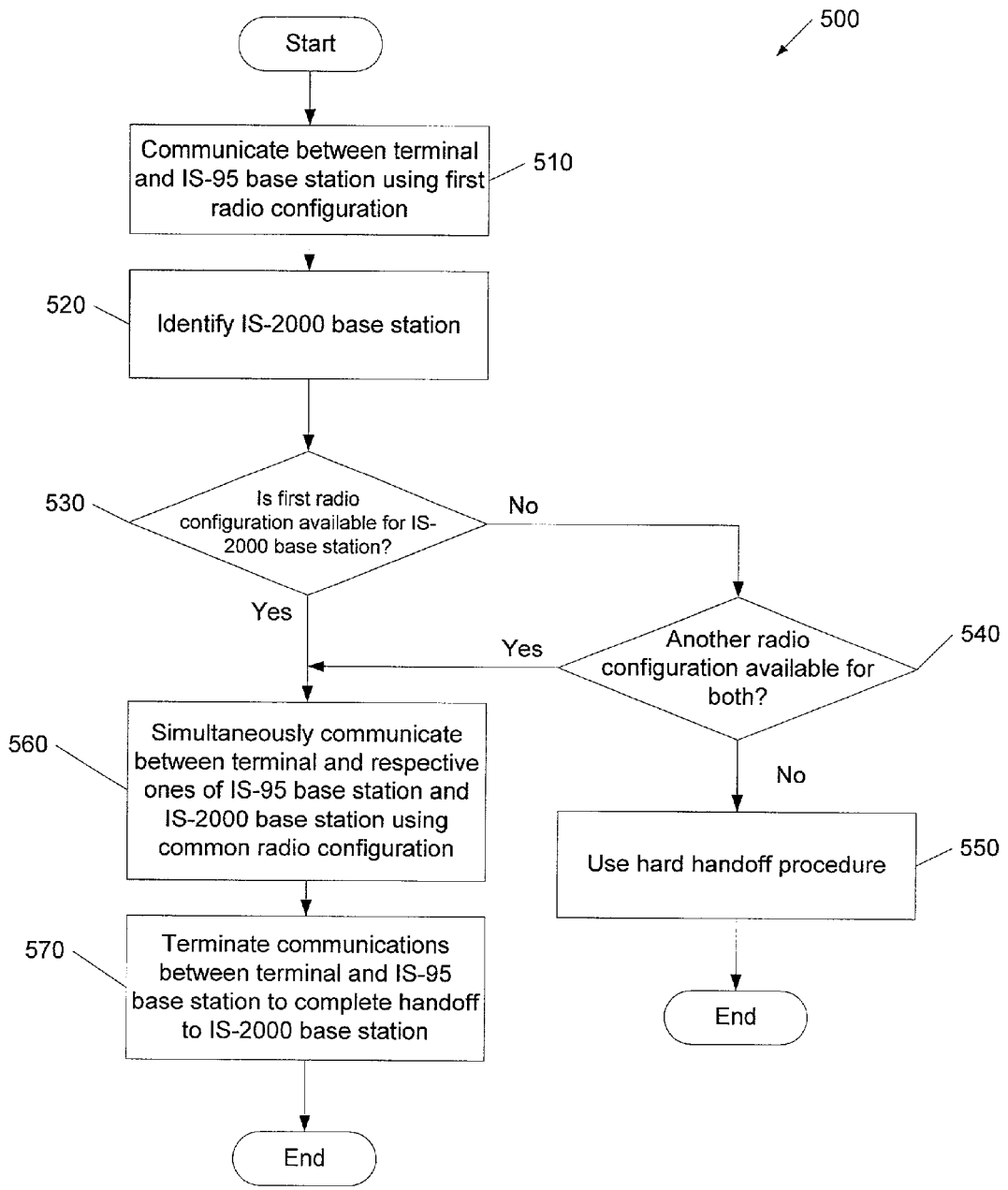

FIG. 5 illustrates exemplary operations 500 for effecting a handoff from an IS-95 base station to an IS-2000 base station accord present invention. A wireless terminal and an IS-95 base station communicate according to a first radio configuration (Block 510). An IS-2000 base station is identified (Block 520), for example, using RSSI and/or other criteria. If the first radio configuration is available for the IS-2000 base station (Block 530), for example, if there is a Walsh coded channel available conforming to the first radio configuration, the wireless terminal communicates with respective ones of the IS-95 base station and the IS-2000 base station using the commonly supported first radio configuration (Block 560). If the first radio configuration is not available for the IS-2000 base station, but a second commonly supported radio configuration is available (Block 550), the wireless terminal communicates with respective ones of the IS-95 base station and the IS-2000 base station using the commonly supported second radio configuration (Block 560). Subsequently, communications between the wireless terminal and the IS-95 base station may be terminated to complete handoff to the IS-2000 base station (Block 570). If no commonly s available (Block 540), a hard handoff procedure may be performed to achieve handoff to the IS-2000 base station (Block 550).

Figure 6:
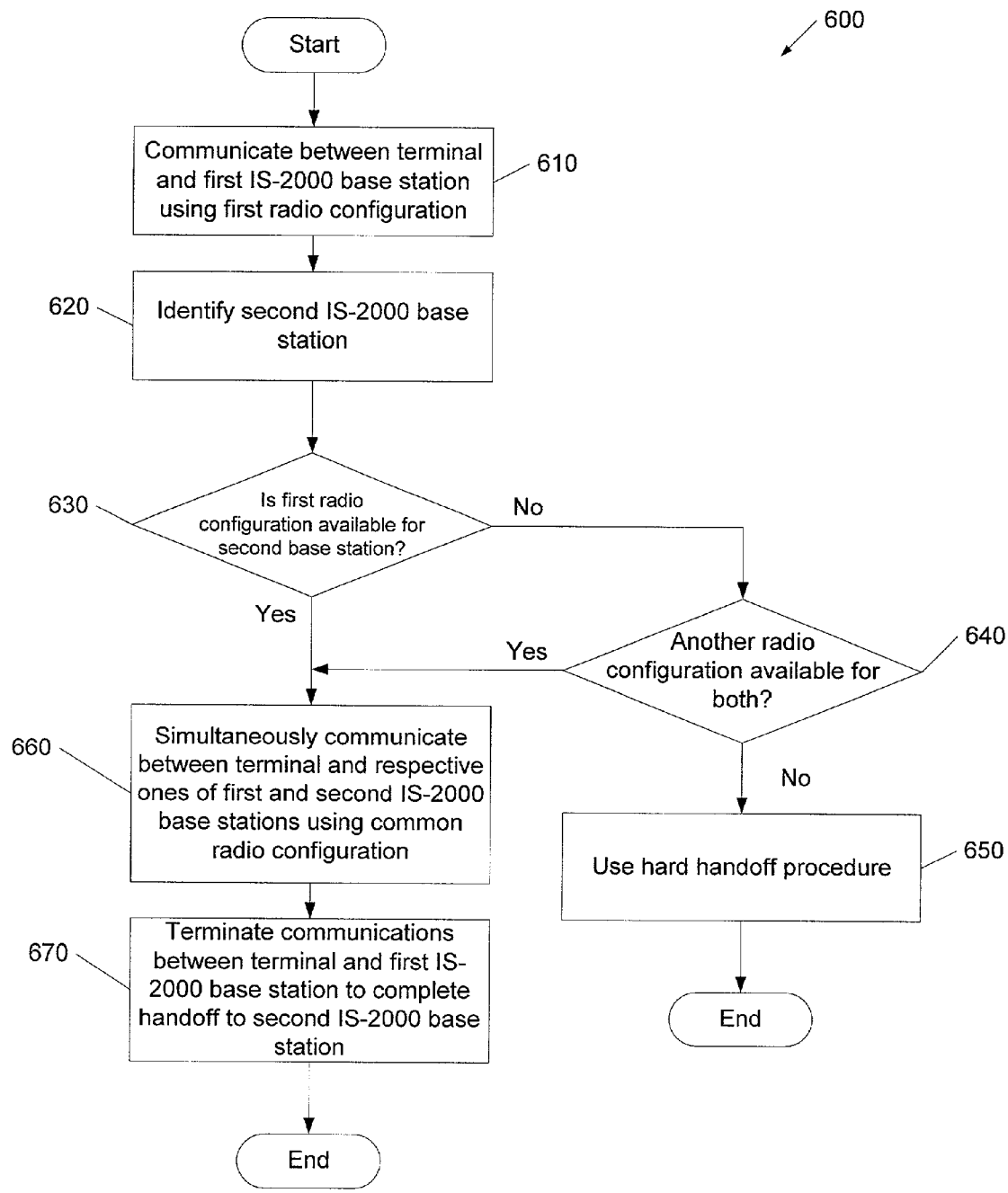

FIG. 6 illustrates exemplary operations 600 for effecting a handoff from an first IS-2000 base station to a second IS-2000 base station according to other embodiments of the present invention. A wireless terminal and a first IS-2000 base station communicate according to a first radio configuration (Block 610). A second IS-2000 base station is identified (Block 620), for example, using RSSI and/or other criteria. If the first radio configuration is available for the second IS-2000 base station (Block 630), for example, if there is a Walsh-coded channel available conforming to the first radio configuration, the wireless terminal communicates with respective ones of the first and second IS-2000 base stations using the commonly supported first radio configuration (Block 660). If the first radio configuration is not available for the second IS-2000 base station (Block 630), but a second commonly supported radio configuration is available (Block 650), the wireless terminal communicates with respective ones of the first and second IS-2000 base stations using the commonly supported second radio configuration (Block 660). Subsequently, communications between the wireless terminal and the first IS-2000 base station may be terminated to complete handoff to the second IS-2000 base station (Block 670). If no commonly supported radio configuration is available (Block 640), a hard handoff procedure may be performed to achieve handoff to the second IS-2000 base station (Block 650).

It will be appreciated that the operations described above are provided for illustrative purposes, and that many modifications thereof and alternatives thereto fall within the scope of the present invention. For example, although the discussion above with reference to FIGS. 4-6 relate to soft handoff operations, other operating modes that involve diversity transmission/reception, e.g., modes in which a wireless terminal is simultaneously served by multiple nodes in order to optimize power levels and/or reception characteristics, also fall within the scope of the present invention.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of communicating with a wireless terminal, the method comprising:
communicating between the wireless terminal and a first node according to a first radio configuration of a first set of radio configurations supported by the first node;
identifying a second radio configuration available for a second node that supports a second set of radio configurations that is different from the first set of radio configurations; and
simultaneously communicating between the wireless terminal and respective ones of the first and second nodes according to the identified second radio configuration using common channel coding including a common spreading code, wherein a first one of the first and second sets of radio configurations is constrained to radio configurations that are compliant with a wireless communications standard, and wherein a second one of the first and second sets of radio configurations comprises radio configurations compliant with the wireless communications standard and radio configurations that are non-compliant with the wireless communications standard.

2. A method according to claim 1, wherein the first one of the first and second sets of radio configurations is constrained to IS-95 compliant radio configurations, and wherein the second one of the first and second sets of radio configurations includes IS-2000 compliant radio configurations that are non-compliant with IS-95.

3. A method according to claim 1, wherein simultaneously communicating between the wireless terminal and respective ones of the first and second nodes according to the second radio configuration further comprises:
receiving first and second signals transmitted from respective ones of the first and second nodes at the wireless terminal; and
processing the first and second signals according to a common process.

4. A method according to claim 3:
wherein receiving first and second signals transmitted from respective ones of the first and second nodes at the wireless terminal comprises receiving a composite signal including the first and second signals; and
wherein processing the first and second signals according to a common process comprises processing the composite signal according to a RAKE process.

5. A method according to claim 1, wherein the first and second radio configurations comprise code division multiple access (CDMA) radio configurations.

6. A method according to claim 1, wherein identifying a second radio configuration available for a second node is proceeded by identifying the second node as a best candidate node according to a predetermined criterion.

7. A method according to claim 1, wherein simultaneously communicating between the wireless terminal and respective ones of the first and second nodes according to the identified second radio configuration is preceded by requesting communication according to the second radio configuration from the wireless terminal.

8. A method according to claim 1, wherein simultaneously communicating between the wireless terminal and respective ones of the first and second nodes according to the identified second radio configuration is preceded by commanding the wireless terminal to communicate according to the second radio configuration.

9. A method according to claim 1, wherein simultaneously communicating between the wireless terminal and respective ones of the first and second nodes according to the identified second radio configuration is followed by terminating communications between the wireless terminal and the first node while continuing communications between the wireless terminal and the second node.

10. A method of communicating with a wireless terminal, the method comprising:
communicating between the wireless terminal and a first node according to a first radio configuration of a first set of radio configurations supported by the first node;
identifying a second radio configuration available for a second node that supports a second set of radio configurations that is different from the first set of radio configurations; and
simultaneously communicating between the wireless terminal and respective ones of the first and second nodes according to the identified second radio configuration using a common channel coding including a common spreading code, wherein the second set of radio configurations includes only a subset of the first set of radio configurations.

11. A method of communicating with a wireless terminal, the method comprising:
communicating between the wireless terminal and a first node according to a first radio configuration of a first set of radio configurations supported by the first node;
identifying a second radio configuration available for a second node that supports a second set of radio configurations that is different from the first set of radio configurations; and
simultaneously communicating between the wireless terminal and respective ones of the first and second nodes according to the identified second radio configuration using a common channel coding including a common spreading code, wherein the first set of radio configurations includes only a subset of the second set of radio configurations.

12. A method of performing handoff of a wireless terminal from a first base station supporting a first set of radio configurations to a second base station supporting a second set of radio configurations that is different than the first set of radio configurations, the method comprising:
determining whether a common radio configuration having a common channel coding including a common spreading code is available for the first and second base stations; and
handing off the wireless terminal from the first base station to the second base station based on the determination of whether a common radio configuration is available for the first and second base stations, wherein a first one of the first and second sets of radio configurations is constrained to radio configurations that are compliant with a wireless communications standard, and wherein a second one of the first and second sets of radio configurations comprises radio configurations that are compliant with the wireless communications standard and radio configurations that are non-compliant with the wireless communications standard.

13. A method according to claim 12, wherein the first one of the first and second sets of radio configurations is constrained to IS-95 compliant radio configurations, and wherein the second one of the first and second sets of radio configurations includes IS-2000 compliant radio configurations that are non-compliant with IS-95.

14. A method according to claim 12, wherein handing off the wireless terminal from the first base station to the second base station based on the determination of whether a common radio configuration is available for the first and second base stations comprises performing a soft handoff of the wireless terminal using the common radio configuration.

15. A method according to claim 14, wherein performing a soft handoff of the wireless terminal using the common radio configuration further comprises:
receiving first and second signals transmitted by respective ones of the first and second base stations at the wireless terminal; and
processing the first and second received signals according to a common process.

16. A method according to claim 15:
wherein receiving first and second signals transmitted by respective ones of the first and second base stations at the wireless terminal comprises receiving a composite signal including the first and second signals; and
wherein processing the first and second received signals according to a common process comprises processing the composite signal according to a RAKE process.

17. A method according to claim 12, wherein the common radio configuration comprises a code division multiple access (CDMA) radio configuration.

18. A method of performing handoff of a wireless terminal from a first base station supporting a first set of radio configurations to a second base station supporting a second set of radio configurations that is different than the first set of radio configurations, the method comprising:
   determining whether a common radio configuration having a common channel coding including a common spreading code is available for the first and second base stations; and
   handing off the wireless terminal from the first base station to the second base station based on the determination of whether a common radio configuration is available for the first and second base stations,
   wherein handing off the wireless terminal from the first base station to the second base station based on the determination of whether a common radio configuration is available for the first and second base stations comprises performing a soft handoff of the wireless terminal using the common radio configuration, and wherein performing a soft handoff of the wireless terminal using the common radio configuration comprises changing the radio configuration used for communications between the first base station and the wireless terminal to the common radio configuration and then communicating between the second base station and the wireless terminal according to the common radio configuration.

19. A method of performing handoff of a wireless terminal from a first base station supporting a first set of radio configurations to a second base station supporting a second set of radio configurations that is different than the first set of radio configurations, the method comprising:
   determining whether a common radio configuration having a common channel coding including a common spreading code is available for the first and second base stations; and
   handing off the wireless terminal from the first base station to the second base station based on the determination of whether a common radio configuration is available for the first and second base stations, wherein handing off the wireless terminal from the first base station to the second base station based on the determination of whether a common radio configuration is available for the first and second base stations comprises performing a hard handoff from the first base station to the second base station if a common radio configuration is not available.

20. A wireless communications system, comprising:
   a first node operative to communicate with a wireless terminal according to any of a first set of radio configurations; and
   a radio configuration control circuit operative to identify a common radio configuration of the first set of radio configurations that is also a member of a second set of radio configurations supported by a second node and to responsively cause the first and second nodes to simultaneously communicate with the wireless terminal according to the identified common radio configuration using a common channel coding including a common spreading code, wherein a first one of the first and second sets of radio configurations is constrained to radio configurations that are compliant with a wireless communications standard, and wherein a second one of the first and second sets of radio configurations comprises radio configurations that are compliant with the wireless communications standard and radio configurations that are non-compliant with the wireless communications standard.

21. A system according to claim 20, wherein a first one of the first and second sets of radio configurations is constrained to IS-95 compliant radio configurations, and wherein a second one of the first and second sets of radio configurations includes IS-2000 compliant radio configurations that are non-compliant with IS-95.

22. A system according to claim 20, wherein the radio configuration control circuit is operative to command the wireless terminal to communicate with the first and second nodes according to the identified common radio configuration responsive to identification of the common radio configuration.

23. A system according to claim 20, wherein the radio configuration control circuit is operative to receive a request from the wireless terminal to communicate with the first base node according to the identified common radio configuration and to responsively cause the first node to change its communications with the wireless terminal to conform to the identified common radio configuration.

24. A system according to claim 20, wherein the set of radio configurations comprises a set of code division multiple access (CDMA) radio configurations.

25. A system according to claim 20, wherein the first node comprises a base station.

26. A system according to claim 20, wherein the radio configuration control circuit is positioned at a mobile switching center.

27. A wireless terminal, comprising:
   a transceiver circuit operative to communicate according to a set of radio configurations; and
   a radio configuration control circuit coupled to the transceiver circuit and operative to cause the transceiver circuit to communicate with a first node using a first radio configuration of the set of radio configurations, to identify a second radio configuration of the set of radio configurations supported by a second node, and to responsively cause the transceiver circuit to simultaneously communicate with respective ones of the first and second nodes according to the second radio configuration using a common channel coding including a common spreading code, wherein the first node supports a first set of radio configurations constrained to radio configurations that are compliant with a wireless communications standard, and wherein the second node supports a second set of radio configurations that comprises radio configurations compliant with the wireless communications standard and radio configurations that are non-compliant with the wireless communications standard.

28. A terminal according to claim 27, wherein the radio configuration control circuit is operative to cause the transceiver circuit to transmit a request to simultaneously communicate with the first and second nodes.

29. A terminal according to claim 27, wherein the radio configuration control circuit is operative to cause the transceiver circuit to simultaneously communicate with the first and second nodes responsive to a command received by the transceiver circuit.

30. A terminal according to claim 27, wherein the set of radio configurations comprises a set of code division multiple access (CDMA) radio configurations.

31. A system, comprising:

lneans for communicating between a wireless tetTninal and a first node according to a first radio configuration of a first set of radio configurations supported by the first node;

means for identifying a second radio configuration available for a second node that supports a second set of radio configurations that is different from the first set of radio configurations; and means, responsive to the means for identifying a second radio configuration available for a second node that supports a second set of radio configurations that is different from the first set of radio configurations, for simultaneously communicating between the wireless terminal and respective ones of the first and second nodes according to the identified second radio configuration using a common channel coding including a common spreading code, wherein a first one of the first and second sets of radio configurations is constrained to radio configurations that are compliant with a wireless communications standard, and wherein a second one of the first and second sets of radio configurations comprises radio configurations compliant with the wireless communications standard and radio configurations that are non-compliant with the wireless communications standard.

32. A system according to claim 31, wherein a first one of the first and second sets of radio configurations is constrained to IS-95 compliant radio configurations, and wherein a second one of the first and second sets of radio configurations includes IS-2000 compliant radio configurations that are non-compliant with IS-95.

33. A system according to claim 31, wherein the first and second radio configurations comprise code division multiple access (CDMA) radio configurations.

34. A system, comprising:

means for determining whether a common radio configuration having a common channel coding including a common spreading code is available for first and second base stations, the first base station supporting a first set of radio configurations and the second base station supporting a second set of radio configurations that is different than the first set of radio configurations; and means, responsive to the means for determining whether a common radio configuration having a common channel coding including a common spreading code is available for first and second base stations, for handing off the wireless terminal from the first base station to the second base station based on a determination of whether a common radio configuration is available for the first and second base stations, wherein a first one of the first and second sets of radio configurations is constrained to radio configurations that are compliant with a wireless communications standard, and wherein a second one of the first and second sets of radio configurations comprises radio configurations that are compliant with the wireless communications standard and radio configurations that are non-compliant with the wireless communications standard.

35. A system according to claim 34, wherein a first one of the first and second sets of radio configurations is constrained to IS-95 compliant radio configurations, and wherein a second one of the first and second sets of radio configurations includes IS-2000 compliant radio configurations that are non-compliant with IS-95.

36. A system according to claim 34, wherein the means for handing off the wireless terminal from the first base station to the second base station based on a determination of whether a common radio configuration is available for the first and second base stations comprises means for performing a soft handoff of the wireless terminal using the common radio configuration.

37. A system, comprising:

means for determining, whether a common radio configuration having a common channel coding including a common spreading code is available for first and second base stations, the first base station supporting a first set of radio configurations and the second base station supporting a second set of radio configurations that is different than the first set of radio configurations; and means, responsive to the means for determining whether a common radio configuration having a common channel coding including a common spreading code is available for first and second base stations, for handing off the wireless terminal from the first base station to the second base station based on a determination of whether a common radio configuration is available for the first and second base stations, wherein the means for handing off the wireless terminal from the first base station to the second base station based on a determination of whether a common radio configuration is available for the first and second base stations comprises means for performing a hard handoff from the first base station to the second base station if a common radio configuration is not available.

* * * * *

UNITED STATES PATENT AND TRADEMARK OFFICE
CERTIFICATE OF CORRECTION

PATENT NO. : 7,295,536 B2 Page 1 of 1
APPLICATION NO. : 09/754490
DATED : November 13, 2007
INVENTOR(S) : Refai et al.

It is certified that error appears in the above-identified patent and that said Letters Patent is hereby corrected as shown below:

Column 13, Claim 31, Line 2: Please correct "Ineans"
To read -- means --

Signed and Sealed this

Eleventh Day of March, 2008

JON W. DUDAS
*Director of the United States Patent and Trademark Office*